United States Patent [19]

Chen

[11] Patent Number: 5,110,157
[45] Date of Patent: May 5, 1992

[54] STRUCTURE OF A WATER FAUCET JOINT

[76] Inventor: Kun-yang Chen, 293, Cheng Tu Road, Taichung, Taiwan

[21] Appl. No.: 615,259

[22] Filed: Nov. 19, 1990

[51] Int. Cl.$^5$ .............................................. F16L 37/00
[52] U.S. Cl. ........................................ 285/8; 285/277; 285/316; 285/24; 251/148
[58] Field of Search .................... 285/316, 276, 277, 8, 285/24; 137/801; 251/148, 152

[56] References Cited

U.S. PATENT DOCUMENTS

| 1,324,654 | 12/1919 | Ferguson | 285/277 |
| 2,255,333 | 10/1938 | Scheiwer | 285/277 |
| 3,298,715 | 12/1963 | Stehle | 285/277 |
| 3,315,532 | 4/1967 | Carnesecca, Jr. et al. | 285/277 |
| 3,458,210 | 5/1965 | Whitehouse | 285/277 |

FOREIGN PATENT DOCUMENTS

| 671036 | 9/1963 | Canada | 285/277 |
| 723375 | 12/1965 | Canada | 285/277 |
| 1138289 | 4/1966 | United Kingdom | 285/277 |

Primary Examiner—Dave W. Arola
Assistant Examiner—Timothy Aberle

[57] ABSTRACT

The structure of a water faucet joint comprises a faucet having a main body integrated with a fastening sleeve, a stoppage sleeve and a conduit connector. The faucet has an inner washer recess for a stoppage-sleeve inner washer contracting therein, and an outer washer recess for a stoppage-sleeve outer washer contracting therein to press against the stoppage sleeve at its rear end. The inner washer and a coiled spring is encased in a spring-receiving recess which is formed on the interior of the stoppage sleeve. The stoppage sleeve is positioned but slidable in one way direction by the stoppage-sleeve inner and outer washers, and therebetween, a plurality of positioning holes are radially formed on the outer circumference of the fastening sleeve for a plurality of restraining members to be disposed and positioned therein. The stoppage sleeve and the conduit connector have a holding groove and a positioning groove formed on their inner and outer circumference respectively for receiving the restraining members therein to ensure that the assembly and replacement of the water faucet joint will be easy and speedy.

1 Claim, 3 Drawing Sheets

STRUCTURE OF A WATER FAUCET JOINT

BACKGROUND OF THE PRESENT INVENTION

The present invention relates to a water faucet joint, and particularly to a water faucet joint of the type which is designed with structures permitting an easy and fast assembly and replacement.

As shown in FIG. 1, a conventional water faucet joint comprises a main body 1 which has a rotatable water tap 2 hinged thereto by means of a screw 200. Located behind the water tap 2 is a hexagonal nut 3, which is used to rotate by means of a wrench, the externally threaded conduit 5 to be set securely into the internally threaded conduit embedded in wall. A ring 4 with an arc surface is disposed in front of athe threaded conduit 5 for the purpose of putting the abutment out of sight. The front end of the main body 1 constitutes a water outlet 100.

It is a well-known fact that it is messy and troublesome to repair or replace a worn-out water faucet joint of the conventional type described above. The conventional water faucet joint with the threaded conduit is prone to bringing about a water leakage because the engagement of the threaded conduits is vulnerable to becoming loose after a prolonged usage. Furthermore, it is tedious and inconvenient to have the conventional water faucet joint replaced, the reason being that the water faucet joint can be detached from the wall water conduit only by means of using a wrench to rotate a hexagonal nut which is securely fastened to the former. As a result, consumers at large often have to resort to a professional plumber for a repair job as such and are thus subjected to a great expense.

Therefore, the primary object of the present invention is to provide a water faucet joint with structures permitting an easy and speedy assembly and replacement.

Another object of the present invention is to provide a water faucet joint with structures permitting its assembly and replacement without using any hand tool.

SUMMARY OF THE PRESENT INVENTION

The structure of a water faucet joint that can be replaced with ease and speed comprises a faucet, a stoppage sleeve, and a conduit connector. The faucet comprises a main body and a fastening sleeve having two grooves respectively for a stoppage-sleeve inner washer and a stoppage-sleeve outer washer contracting therein, a plurality of positioning holes radially formed thereon at an equal interval between the two washers for a plurality of restraining members to be respectively disposed therein, and an open end constituting a connector-receiving rim for the insertion of the water conduit connector. Extending axially outwards from the connector-receiving rim to terminate a positioning tab. The two washers are provided for serving to restrain the slidable movement of the stoppage sleeve only in one direction.

The stoppage sleeve, encased on the fastening sleeve, has a front end extending radially outwards to terminate a circular flange. Adjacent to the circular flange, a spring-receiving recess has formed its inner circumference lower than the inner circumference of the stoppage sleeve for the stoppage-sleeve inner washer and a coiled spring to be disposed thereon. An installing hole is adjacent to the rear end of the stoppage sleeve for the restraining members passing therethrough to be positioned in the positioning holes. A holding groove is circularly formed on the inner circumference of the stoppage sleeve adjacent to the installing hole for permitting the restraining members to be received therein while the stoppage sleeve is sliding on and along the outer circumference of the fastening sleeve and the main body.

The conduit connector has a front open end, a threaded rear open end constituting a water inlet attaching to a conduit embedded in the wall for water support, a hexagonal head integrated with its outer circumference adjacent to the water inlet. A washer groove is circularly formed on the outer circumference of the conduit connector and located adjacent to its front open end opposed to the water inlet for the accommodation of washer. A positioning groove is circularly formed between the hexagonal head and the washer groove to accommodate the restraining members. The hexagonal head has a mortise notch adjacent to the outer circumference of the conduit connector for the engagement with the positioning tab.

BRIEF DESCRIPTION OF THE PRESENT INVENTION

DESCRIPTION OF THE PRESENT INVENTION

Figure 1:
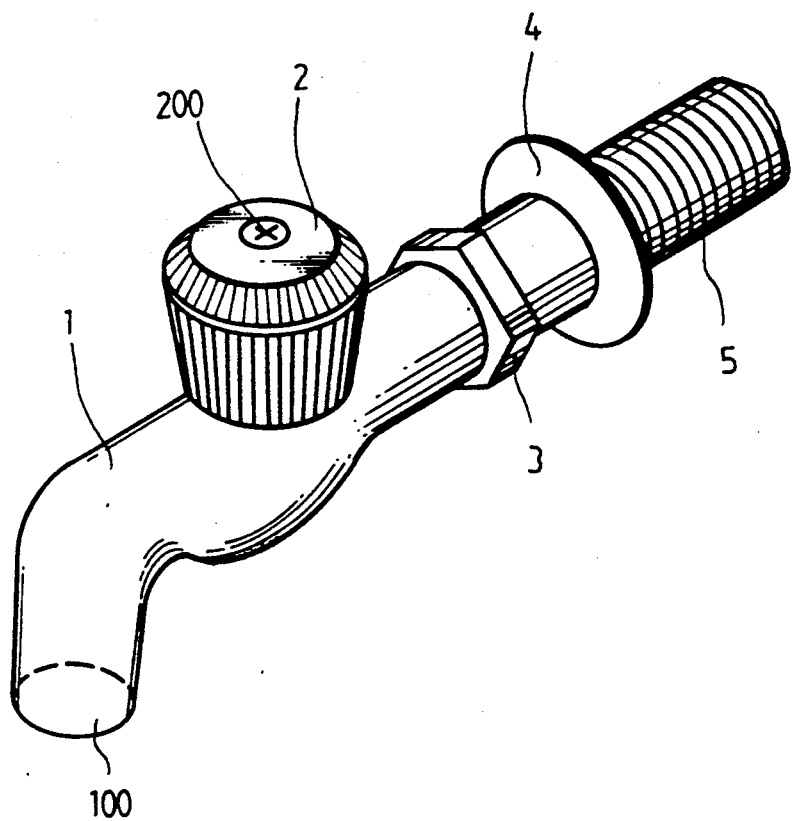
FIG. 1 is a perspective view of a prior art.
Figure 2:
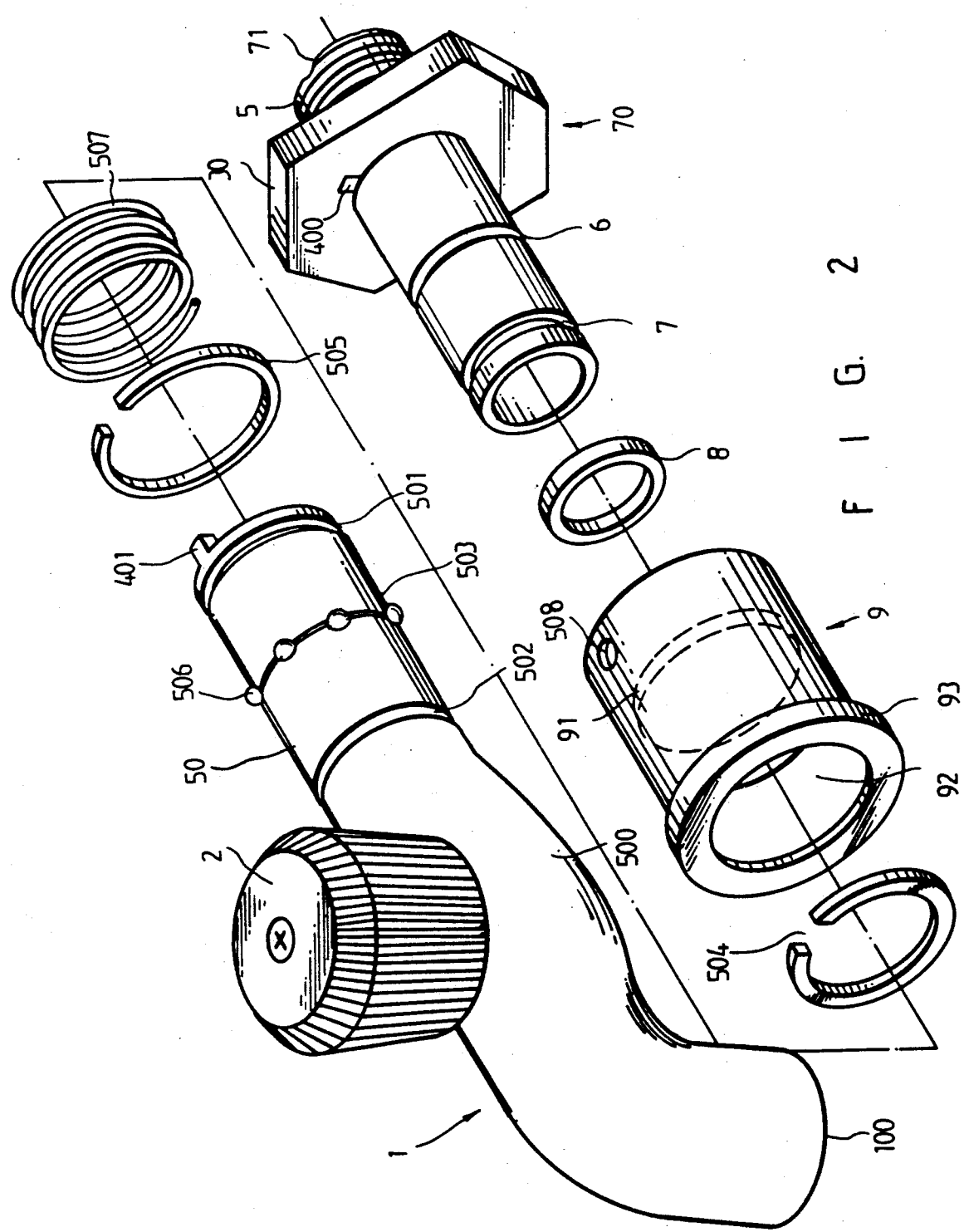
FIG. 2 is a partially exploded view of the embodiment which conveys the concept of the present invention.
Figure 3:
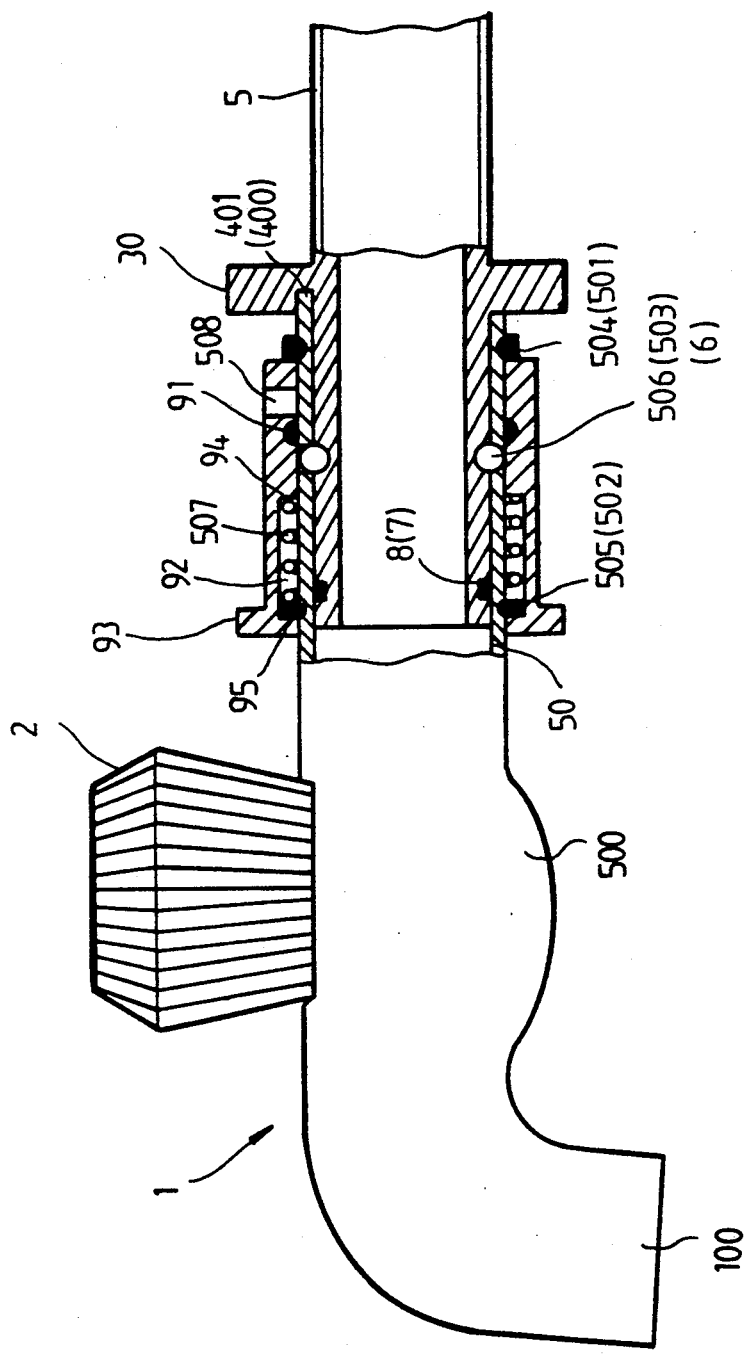
FIG. 3 is a cross-sectional view of the assembled embodiment of FIG. 2 taken from the right side.

Referring to FIG. 2 and 3, the structure of a water faucet joint embodied in the present invention primarily comprises a conduit connector 70, a faucet 1, and a stoppage sleeve 9.

The conduit 70, generally tube in shape, has a front open end, and a rear open end which constituting a water inlet 71. The water inlet 71 has male threads 5 formed on its outer circumference. The diameter of the front open end the water conduit 70 is smaller than that of the stoppage sleeve 9. The diameter of the rear open end of the water conduit 70 is smaller than that of a conduit 300.

The conduit 300 is installed in the wall, and has one open end connecting to the water source for water support, and the other open end adjacent to the wall, having female threads formed on its inner circumference for the water inlet 71 attaching thereto. Since the conduit 300 with its two open end arrangements remains in the conventional art which is not concerning the subject matter of the instant invention, they are therefore not shown in the attached formal drawings.

Adjacent to the male threads 5, extending outwardly from the outer circumference of the conduit connector 70 to terminate a hexagonal head 30 which is integral with the conduit connector 70. The hexagonal head 30 has a mortise notch 400 formed thereon adjacent to the outer circumference of the conduit connector 70. The conduit connector 70 has a positioning groove 6 and a washer groove 7 formed on its outer circumference. The positioning groove 6 is roughly situated at the middle of the hexagonal head 30 and the front end of the conduit connector 70. The washer groove 7 is located on the outer circumference adjacent to the front open end of the conduit connector 70 for accommodating a washer 8. The thickness of the washer 8 is equal to the depth of the washer groove 7, and therefore the washer 8 will not stretch out from the outer circumference when it is disposed within the washer groove 7.

The faucet 1 comprises a main body 500 having a first open end curving downwardly to terminate a water outlet 100, a water handle 2 disposed thereon and attached to the top circumference of the main body 500, a fastening sleeve 50 integrated with the water inlet of the conventional faucet, and a second open end constituting a connector-receiving rim 40.

The main body 500 and the fastening sleeve 50 are actually formed in a single piece construction. The original water inlet of the conventional faucet i.e., the conjunction of the main body 500 and the fastening sleeve 50 in the embodiment conveys the concept of the present invention is circularly formed an inner washer recess 502. A stoppage-sleeve inner washer 505 is made of metal in a C shape and provided to be disposed in the inner washer recess 502. The inner diameter of the stoppage-sleeve inner washer 505 is slightly smaller than than the outer circumference of the inner washer recess 502. Extending axially outwards from the connector-receiving rim 40, a positioning tab 401, rectangular in shape and corresponding to the mortise notch 400, is provided for the connection of the faucet 1 and the conduit connector 70. Adjacent to the connector-receiving rim 40, an outer washer recess 501 is circularly formed on the circumference of the fastening sleeve 50 for engaging with a stoppage-sleeve outer washer 504. The stoppage-sleeve outer washer 504 is made of metal in a C shape and provided to be disposed in the outer washer recess 501. The inner diameter of the stoppage-sleeve outer washer 504 is slightly smaller than the outer circumference of the outer washer recess 501. Between the outer washer recess 501 and the inner washer recess 502, a plurality of positioning holes 503 are radially formed on the circumference of the fastening sleeve 50 at an equal interval for a plurality of restraining members to be disposed and positioned therein. The size of the positioning holes 503 is smaller than that of the restraining members. By this means, the restraining members are disposed in the positioning holes 503 respectively, instead of dropping into the fastening sleeve 50. In the embodiment, six steel balls 506, as the restraining members, are provided to be slided therein. The diameter of the positioning holes 503 is slightly smaller than that of the steel balls 506, and therefore, the steel balls 506 are disposed and positioned in the postioning holes 503 respectively, instead of dropping into the fastening sleeve 50. The caliber of the connector-receiving rim 40 is slightly greater than the outer circumference of the conduit connector 70.

The stoppage sleeve 9, tube in shape, has a front end extending radially outwards from its outer circumference to terminate a circular flange 93, a spring-receiving recess 92 formed on its inner circumference adjacent to the circular flange 93, and a rear end slightly in front of the outer washer recess 501 of the fastening sleeve 50. The inner circumference of the spring-receiving recess 92 is lower than that of the stoppage sleeve 9 to form a space between the stoppage sleeve 9 and the outer circumference of the fastening sleeve 50 for the accommodation of a stoppage-sleeve inner washer 505 and a coiled spring 507. Near to the rear end of the stoppage sleeve 9, an installing hole 508 is formed thereon corresponding to the position of the positioning holes 503. The size of the installing hole 508 is slightly greater than that of the restraining members i.e., steel ball 506 for installing six steel balls 506 in six positioning holes 503 respectively. Adjacent to the installing hole 508, a holding groove 91 is circularly formed on the inner circumference of the stoppage sleeve 9. The thickness of the stoppage-sleeve inner washer 505 being slightly greater than the caliber of the circular flange 93 is for ensuring the stoppage sleeve 9 being slightly and axially slidable in a direction towards the water handle 2 instead of the other direction opposed to the water handle 2. And again, the thickness of the stoppage-sleeve outer washer 504 being slightly greater than the caliber of the rear end of the stoppage sleeve 9 is for reinforcing the stoppage sleeve 9 being slightly and axially slidable in the direction towards the water handle 2, but not the direction which is opposed to the water handle 2.

Referring to FIG. 3, the assembled operation of the embodiment is described hereunder. First, axially connect the conduit connector 70 to the conduit 300 with the male threads 5 of the conduit connector 70 engaging with the female threads of the conduit 300 by rotating the hexagonal head 30, and then insert the washer 8 over the second groove 7 of the conduit connector 70. Second, axially dispose the stoppage-sleeve inner washer 505 within the spring-receiving recess 92 until it is pressed against the inner surface of the circular flange 93 by, again axially, disposing the coiled spring 507 within the spring-receiving recess 92. Then, insert the stoppage sleeve 9 with the stoppage-sleeve inner washer 505 and the coiled spring 507 disposed therewithin over the fastening sleeve 50 in a direction towards the water handle 2. The stoppage-sleeve inner washer 505, thanks to its shape and metal nature plus the compressure of the coiled spring 507 which is caused by the insertion, will expand to be insertable over the fastening sleeve 50 and contract in the inner washer recess 502. Therefore, the stoppage sleeve 9 will be positioned but slidable in the direction towards the water handle 2 by inserting the stoppage-sleeve outer washer 504 over the connector-receiving rim 40 to contract in the outer washer recess 501 and pressing against the rear end of the stoppage sleeve 9 to reinforce the effect of the sliding direction of the stoppage sleeve 9. Slide the stoppage sleeve 9 towards the water handle 2 until the installing hole 508 is respectively corresponding to each of the positioning holes 503, then dispose the restraining members i.e., the steel balls 506 in the positioning holes 503 one by one via the installing hole 508. And thus, the engagement of the faucet 1 and the stoppage sleeve 9 which has the stoppage-sleeve inner washer 505 and coiled spring 507 disposed therewithin, and the stoppage-sleeve outer washer 504 pressing against the rear end of the stoppage sleeve 9 is assembled. In the assembled operation of the faucet 1 and the conduit connector 70, adjust the hexagonal head 30 to ensure the mortise notch 400 corresponding to the positioning tab 401, and insert the faucet 1 over the conduit connector 70 through the caliber of the connector-receiving rim 40 until the front open end of the conduit connector 70 is obstructed by the restraining members i.e., steel balls 506. Then, slide the stoppage sleeve 9 towards the water handle 2 to slide the restraining members, steel balls 506, into the holding groove 91. And keep inserting the faucet 1 over the conduit connector 70 until the positioning tab 401 finally engages with the mortise notch 400. Release the stoppage sleeve 9, and the stoppage sleeve 9 will move in a direction opposed to the water handle 2 by the recoiled force of the coiled spring 507 to slide the restraining members, steel balls 506, out of from the holding groove 91 and dispose in the positioning groove 6, and the stoppage sleeve 9 to be contact with the hexagonal head 30. And thus, the water faucet joint which structure embodied in the present invention is completed.

In the process of replacing the faucet 1, the stoppage sleeve 9 and fastening sleeve 50 have to be removed and disassembled from the conduit connector 70 which is permanently attached to the conduit 300 installed in the wall. The steps are described as follows. First, slide the stoppage sleeve 9 in the direction towards the water handle 2 to align the holding groove 91 with the restraining members, steel balls 506, and subsequently sliding the combined entity of the stoppage sleeve 9 and the fastening sleeve 50 out of the conduit connector 70. And thus, the task of replacing a water faucet joint embodied in the present invention is accomplished easily and speedily.

Further modifications of the invention herein described will occur to persons skilled in the art and all such modifications are deemed to be within the scope of the invention as defined by the appended claims.

I claim:

1. A structure of a water faucet joint comprising:

a) a faucet head including an outlet on one end thereof and a generally cylindrical fastener sleeve on the other end thereof;
   a first annular recess formed near the terminal end of said fastener sleeve, and a second annular recess formed a predetermined distance inwards from said first annular recess;
   a first and second elastic retaining rings disposed in said first and second annular recesses, respectively;
   a plurality of positioning holes formed at predetermined radial positions on said fastener sleeve between said first and second annular recesses, each having a tapered cross section that is smaller on the interior side of said fastener sleeve than on the exterior side thereof;
   an axial projection provided on the periphery of the terminal end of said fastener sleeve at a predetermined position thereon;

b) a generally cylindrical conduit connector with an outer diameter substantially equal with the inner diameter of said fastener sleeve, so that said fastener sleeve can be inserted over said conduit connector;
   a flange provided on said conduit connector in a medial position thereon, having a recessed notch formed at a predetermined position thereon for receiving said projection on said fastener sleeve when said fastener sleeve is mounted thereon;
   at least on annular recess formed around said conduit connector near the terminal end thereof which is received within said fastener sleeve when mounted thereon, each said annular recess carrying a sealing ring therein;
   an annular positioning groove formed around the outer periphery of said conduit connector at a predetermined position thereon, between said annular recess thereon and said flange, said positioning groove registering with said positioning holes on said fastener sleeve when mounted thereon;

c) a plurality of generally ball shaped retaining elements, each disposed within a respective said positioning hole and having a diameter greater than the cross section of said positioning holes on the interior side of said fastener sleeve so as to prevent said retaining elements from passing therethrough, said retaining elements engaging said annular positioning groove on said conduit assembly when said fastener sleeve is mounted thereon;

d) a generally cylindrical stoppage sleeve slidingly secured over said fastener sleeve;
   an annular cavity formed around the inner periphery of said stoppage sleeve at a predetermined position thereon, said annular cavity containing and abutting said second retaining ring;
   a coil compression spring disposed within said annular cavity, having one end thereof abutting said second retaining ring and the other end thereof abutting a side of said annular cavity to bias said stoppage sleeve towards a forward position near the terminal end of said fastener sleeve, where said stoppage sleeve abuts said first retaining ring;
   an installing hole formed on the periphery of said stoppage sleeve near the end thereof which abuts said first retaining ring, through which said retaining elements can be inserted into or retracted from said positioning holes when said stoppage sleeve is drawn back to a rearward position;
   an annular holding groove formed around the inner periphery of said stoppage sleeve between said installing hole and said annular cavity;

wherein, when said fastener sleeve is mounted over said conduit connector, said stoppage sleeve prevents the outward radial displacement of said retaining elements from said positioning groove on said conduit connector to secure said faucet head with said conduit connector when said conduit connector is in said forward position abutting said first retaining ring;

said faucet head can be retracted from said conduit connector by drawing back said stoppage sleeve until said holding groove thereon registers with said retaining elements to allow the outward radial displacement thereof and disengagement from said positioning groove.

* * * * *